United States Patent Office 3,501,425
Patented Mar. 17, 1970

3,501,425
PROCESS FOR PREPARING THIXOTROPIC SOLUTIONS OF OIL-MODIFIED ALKYD RESINS AND RESULTING PRODUCT
Hermann Delius, Ahrensburg, Holstein, Germany, assignor to Reichhold Chemicals, Inc., White Plains, N.Y.
No Drawing. Filed July 2, 1965, Ser. No. 469,315
Claims priority, application Germany, July 30, 1964,
R 38,493
The portion of the term of the patent subsequent to Feb. 27, 1985, has been disclaimed
Int. Cl. C08g 22/10; C09d 5/04
U.S. Cl. 260—22
8 Claims

ABSTRACT OF THE DISCLOSURE

Thixotropic solutions of oil-modified alkyd resins are prepared as follows: monohydric alcohols are reacted with organic polyisocyanates in such a manner that the resultant condensation products have free isocyanate groups; these condensation products are subsequently condensed with oil-modified alkyd resins bearing free hydroxyl groups.

The present application is a continuation-in-part of my prior application Ser. No. 455,592, filed May 13, 1965, now Patent No. 3,371,056, dated Feb. 27, 1968, which in turn is a continuation-in-part of Ser. No. 56,117, filed Sept. 15, 1960, now Patent No. 3,227,778, dated Jan. 4, 1966.

The present invention relates to a process for the preparation of thixotropic solutions of oil-modified alkyd resins which is characterized in that solutions of hydroxyl groups-containing oil-modified alkyd resins are reacted by mixing and, if necessary, by heating with reaction products containing preponderantly a free isocyanate group obtained from organic polyisocyanates and alcoholic monohydroxyl compounds containing solely C, H and O atoms.

A variation of the process for preparing thixotropic solutions of oil-modified alkyd resins consists in reacting, by heating, oil-modified alkyd resins containing hydroxyl groups with reaction products containing preponderantly one free isocyanate group obtained from organic polyisocyanates and monohydroxyl compounds, and dissolving the reaction products in suitable solvents. Thus the number of available reactive isocyanate groups should exceed the number of available hydroxyl groups by one. In other words the ratio of NCO:OH should be X:(X—1), wherein X represents the number of isocyanate groups in the polyisocyanate used.

The expression oil-modified alkyd resins is understood to mean mixed polyesters that are obtained by condensation of di- or polycarboxylic acids and/or their anhydrides, saturated and/or unsaturated fatty acids and polyalcohols applied in molar excess. As the di- or polycarboxylic acids it is preferred to use o-phthalic acid or o-phthalic acid anhydride. However, other polycarboxylic acids or their anhydrides are also suitable, as for example isophthalic acid, tetra- and hexahydrophthalic acid, tetrachlorophthalic acid, hexachloro-endo-methylene-tetrahydrophthalic acid, endomethylene-tetrahydrophthalic acid, trimellitic acid as well as adipic and sebacic acid. In addition to these polycarboxylic acids, it is possible to use small quantities of $\alpha,\beta$-unsaturated dicarboxylic acids or their anhydrides such as maleic acid, maleic acid anhydride, fumaric acid, itaconic acid, citraconic acid, mesaconic acid and aonitic acid.

The broad definition saturated and unsaturated fatty acids is understood to encompass all straight chain or branched chain compounds or mixtures produced synthetically or occurring in natural products, that have a number of carbon atoms between 6 and 22.

More particularly, the following fatty acids were found to be suitable: caproic acid, caprylic acid, capric acid, lauric acid, myristic acid, palmitic acid, margaric acid, stearic acid, arachic acid, behenic acid, lignoceric acid, palmitolic acid, petroselinic acid, oleic acid, elaidic acid, erucic acid, 9,12-linoleic acid, linolenic acid, arachidic acid, clupanodonic acid, sorbic acid, 9,11-linoleic acid (dehydrated castor oil fatty acid), $\alpha$-elaeostearic acid, $\alpha$-licanic acid, $\alpha$-parinaric acid, ricinoleic acid, 9,10-dihydroxystearic acid and isanolic acid; also isomer mixtures of various isooctane and isononane acid, as for example 3,3,5-trimethylhexane acid, 3,4-dimethyl-1-hexane acid, 3,5-dimethyl-1-hexane acid, 4,5-dimethylhexane acid, which are obtained Oxo-synthesis from branched olefines, as well as the mixtures of branched fatty acids obtained by the same process which are known by the trade name "versatic acid," the main characteristic of which is a high degree of branching at the $\alpha$-carbon atom adjacent to the carboxyl groups.

As the polyalcohols it is possible to use di-, tri-, tetra- and higher valent compounds. Preferred are the tri- and tetravalent alcohols. However, it is possible to also use mixtures of di- and tetravalent polyalcohols. More particularly, the following alcohols are suitable: ethyleneglycol, propanediol-1,2,-butanediol-1,3, butanediol-1,4, diethyleneglycol, dipropyleneglycol and their higher homologues, neopentylglycol, 2,2,4-trimethylpentanediol, pentanediol-1,5, hydroxyalkylated bisphenols, dimethylolcyclohexane, glycerin, trimethylolethane, trimethylolpropane, 2,2-dimethylolbutanol-3, hexanetriol-1,2,6, pentaerythrite and its homologues formed by etherification, such as di- and tripentaerythrite, tetramethylolcyclohexanol, mannite, sorbite and $\alpha$-methylglucoside.

In the preparation of the oil-modified alkyd resins, it is possible to replace the saturated and/or unsaturated fatty acids with other monocarboxylic acids and thus further modify the properties of the end groups. Suitable monocarboxylic acids are for example: natural resin acids such as abietic acid, neoabietic acid, laevo-primaric acid, hydrogenated and partially hydrogenated resin acids, such as dihydro- and tetrahydroabietic acid, also benzoic acid and p-tert.-butylbenzoic acid as well as technical mixtures of fatty and resinic acids known by the name of tall oil.

The preparation of the oil-modified alkyd resin can be carried out either by the use of the free fatty acids or by reesterifying the natural oils and fats, in a first step, with an equivalent quantity of polyalcohol to form the monoglycerides and then, after adding the polycarboxylic acid, completing the polycondensation. The re-esterification is suitably carried out in the presence of catalysts. Suitable catalysts are: lithium ricinoleate, sodium alcoholates, such as sodium methylate, lead oxide, zinc oxide and zinc acetate, calcium oxide and calcium acetate.

In the preparation of the oil-modified alkyd resins in accordance with the re-esterification process it is possible to use non-drying, half-drying and drying fatty oils and fats, such as peanut oil, coconut oil, palm-kernel oil, palm oil, castor oil, hemp oil, cottonseed oil, safflower oil, soy bean oil, sunflower oil, linseed oil, wood oil, oiticica oil, perilla oil and fish oils.

In the oil-modified alkyd resins, the percent content of the oil component is between 20 and 80%, preferably between 30 and 65%. More particularly, the oil component of the resins that contain non-drying oils, such as peanut oil, coconut oil, palm-kernel oil, palm oil and castor oil is preferably between 30 and 50%, whereas the oil component of the resins that contain half-drying and drying oils, such as hemp oil, cottonseed oil, safflower oil, soy bean oil, sunflower oil, linseed oil, wood oil, perilla oil and fish oil is preferably between 30 and 65%.

The oil-modified alkyd resins that are to be reacted in the process consituting the object of the present invention must have a hydroxyl number (determined by the acteylation method with acetic acid anhydride-pyridine of A. Verley and F. Basig, Ber. 34, 3354–58, 1901) of at least between 10 and 300, preferably between 40 and 110 and an acid number of at least between 1 and 40 preferably smaller than 30. Moreover, the oil-modified alkyd resins must be soluble in organic solvents.

As the reaction products containing preponderantly a free isocyanate group derived from organic polyisocyanates and alcoholic monohydroxyl compounds, it is possible to use those obtained by the reaction of organic polyisocyanates, such as 1,2,4- or 1,2,6-toluylenediisocyanate, 4,4'-diphenylmethanediisocyanate, diphenyldimethylmethane-4,4'-diisocyanate, naphthylene-1,5-diisocyanate, triphenylmethane-4,4',4''-triisocyanate and polymethylenepolyphenylisocyanate, cycloaliphatics, such as cyclohexane-1,4-diisocyanate, and aliphatics, such as tetramethylene-1,4-diisocyanate and hexamethylene-1,6-diisocyanate, with alcoholic monohydroxyl compounds, such as saturated and/or unsaturated monoalcohols, ethers of polyols, partial esters of polyols, such as straight- and branched chain saturated and unsaturated monoalcohols of aliphatic, cycloaliphatic, aromatic, arylaliphatic and heterocyclic nature having up to 25 carbon atoms, their substitution products with halogen, nitro groups and the like. Examples of these are methanol, ethanol, propanol, n-butanol, isobutanol, sec.-butanol, 2-methyl-1-pentanol, 2-methylpentanol-3, prim.- and sec.-octanol, 2-ethylhexanol, n-nonanol, n-dodecanol, 6-dodecanol, lauryl-, myristyl- and stearyl alcohol, 2-chloro-1-propanol, 3-bromo-1-propanol, 2,2-dichloro-1-propanol, 2-nitro-1-propanol, 1-chloro-2-propanol, 2-nitro-1-butanol, abietyl alcohol, tetrahydroabietyl alcohol and furfuryl alcohol.

Among the monoalcohols it is preferred to use the compounds that have primary alcoholic hydroxyl groups because of their particular reactivity with isocyanates. However, the monoalcohols having secondary alcoholic hydroxyl groups are also suitable. Aside from saturated alcohols it is possible to use in a comparable manner, also unsaturated alcohols. They offer the additional advantage, owing to their double bonds, of causing further cross-linking to take place during the dryness of the thixotropic oil-modified alkyd resins. Representative compounds belonging to this group are: $\alpha,\beta$-unsaturated alcohols, such as allyl alcohol, methallyl alcohol, ethallyl alcohol, chloroallyl alcohol, crotyl alcohol, phenyl alcohol and methylvinylcarbinol, as well as unsaturated fat alcohols that are prepared by selective hydrogenation of unsaturated fatty acids.

As the alcoholic monohydroxyl compounds it is possible to also use partially etherified polyalcohols. Thus, the two components may contain monoalcohol and polyalcohol radicals, saturated or unsaturated C-C-linkages. The monoalcohol radical in that case can be, additionally, of aromatic, cycloaliphatic or heterocyclic nature. As examples of these are mentioned: the monomethyl-, monoethyl-, mono-n-propyl-, monoisopropyl-, mono-n- and monoisobutyl-, monoallyl-, monomethallyl-, monoethallyl-, monochloroallyl-, monocrotyl-, monophenylallyl-, monobenzyl- and monofurfuryl ethers of ethylene glycol, the corresponding diethers of glycerin, trimethylolethane and propane and analogous triethers of pentaerythrite.

The reaction of the hydroxyl groups-containing oil-modified alkyd resins takes place in a liquid or dissolved or melted condition. The reaction products of organic polyisocyanates and monohydroxyl compounds are most advantageously used as freshly prepared intermediate products. The intermediate products vary to some degree in their reactivity which results mainly from the starting isocyanate and not so much from the starting monohydroxyl compound. In the preparation of the intermediate product the reaction components are applied in stoichiometrical proportions, so that the resulting reaction (intermediate) product contains a free isocyanate group. The reaction of the oil-modified alkyd resin with the intermediate product takes place by mixing either at room temperature or by applying heat. In this connection, it is preferred to adjust the quantitative proportions of hydroxyl groups-containing oil-modified alkyd resin and a free-isocyanate group-containing intermediate product in such a way that at the termination of the reaction, the reaction product always contains free hydroxyl groups or, in other words, the final reaction product must not contain free isocyanate groups. By reacting equivalent quantities of reaction components it is possible to also obtain reaction products that contain no free hydroxyl groups and no free isocyanate groups. The reaction can be accelerated by the use of catalysts, as for example tertiary amines and/or metal soaps, naphthenates, octoates and the like. As tertiary amines it is possible to use morpholine or triethylenediamine, and as metal soaps the octoates or naphthenates of zinc or lead. The reaction temperatures when working in a melt, are from about 90 to 120° C. This involves preferably working in an inert gaseous atmosphere. It is preferred to carry out the reaction in a solution. In this case it is immaterial whether the reaction takes place in the presence or absence of air. The reaction in the solution can be carried out over a periol of several days at room temperature or within a few hours at about 30 to 70° C., preferably 50 to 60° C.

As the solvent, it is possible to use all the solvents commonly used in lacquer industry, as for example mineral spirits, turpentine oil, aromatics, such as benzene, toluene and xylene, esters, such as ethyl and butyl acetate, ketones, such as acetone, butanone and methylisobutyl ketone, glycol ethers, such as methyl-, ethyl- and butyl ether of ethanediol, alcohols, such as propanol, n- and l-butanol. The selection of the solvent depends, in the first place, on the oil length of the oil-modified alkyd resin. Whereas resins having an oil length of 55% are soluble even in aliphatic mineral spirits, it is preferred to use for all other resins that have a lower oil length, solvents such as aromatics, esters, glycol ether, alcohols and ketones. In the preparation of the thixotropic high-oil alkyds, i.e., those having an oil length of at least 55%, which are to be soluble in mineral spirits, it is recommended to use for the preparation of the intermediate products having at least one free isocyanate group from organic polyisocyanates and monohydroxyl compounds, specifically monohydroxyl compounds that contain at least 5, but preferably 6–12 carbon atoms.

The new oil-modified alkyl resins according to the present invention are distinguished by their thixotropic properties in dissolved condition, so that solutions of these alkyl resins, when used for lacquer purposes, do not trickle and flow down on vertical walls. Thixotropic alkyl resins are known per se and the preparation thereof is described in U.S. Patent 2,663,649. However, the process described in this patent is only applicable to mineral spirits-soluble long-oil alkyds, i.e., those having an oil content of 55%. Upon addition of even small quantities of polar solvents, the thixotropy of such resin solutions breaks down completely. It is therefore not possible to prepare by the process of U.S. Patent 2,663,649 thixotropic short-oil alkyds that are solely soluble in aromatic solvents, as for example toluene or xylene. A further drawback of the process described in this U.S. patent is the fact that the thixotropic properties of these resins are difficult to reproduce, since it is necessary to add a polyamide resin to the oil-modified alkyd resin after the condensation has been completed and then maintain the mixture at a raised temperature until a certain turbidity point has been reached. After this, the product is dissolved in mineral spirits. The exact determination of the turbidity point is difficult and there are frequent occurrences of exceeding this period or falling below it which creates serious fluctuations in the thixotropic properties.

In comparison, the process of the present invention furnishes products that are much more uniform and is applicable to all oil-modified alkyd resins even when these are already present in dissolved form. The reaction between the hydroxyl groups-containing oil-modified alkyd resins and the reaction products having a free isocyanate group, in extreme cases, can be carried out at room temperature so that it is possible to dispense with complicated apparatus.

The invention is illustrated by the following examples, without being limited thereby.

EXAMPLE 1

A castor oil alkyd resin having an oil content of 43% is prepared as follows:

(a) 654 g. castor oil and 298 g. glycerin are heated at 130° C. in a 2-liter three-necked flask equipped with a stirrer, thermometer and water separator, using an oil bath and admitting $CO_2$ as a protective gas. At the same temperature there are added in separate portions 577 g. phthalic acid anhydride whereupon the temperature is increased to 180° C. This temperature is maintained until a sample taken from the reaction mixture, upon cooling to room temperature, remains clear. At this point, the temperature is raised within 5 hours to 220° C. and is kept at this level until the viscosity of a 50% solution in xylene reaches a value of 110 seconds (measured in a DIN-beaker having a 4 mm. nozzle) and the acid number has dropped below 30. The product is thereafter cooled and dissolved up to 50% in xylene. The undissolved resin has a hydroxyl number of 150.

(b) A reaction product is obtained from 176 g. toluylene diisocyanate of which 65% consisted of the 2,4-isomer and 35% of the 2,6-isomer, and 58 g. allyl alcohol the latter being added in separate portions to the toluylenediisocyanate at a temperature between 50 and 60° C. After completing the addition and dissipating the heat developed by the reaction, the temperature is maintained at 70° C. for one hour.

(c) 100 g. of the 50% alkyl resin solution in xylene, obtained in accordance with Example 1a, are mixed at room temperature with 10 g. of the reaction product obtained in accordance with Example 1b, the whole being then heated at 50° C. for 5 hours, without stirring. After cooling, there is recovered a light-yellow, clear and highly thixotropic alkyd resin solution. It is in the form of a stiff gel which upon stirring becomes thinly liquid and again solidifies when the stirring is stopped.

EXAMPLE 2

It is possible to arrive at a product having the same properties by mixing together, at about 110–120° C., 50 parts of the alkyd resin according to Example 1a before it is dissolved in xylene and 10 parts of the product obtained according to Example 1b, and reacting the mixture under a $CO_2$ atmosphere for 30–40 minutes, the resulting reaction product being then dissolved in 50 parts of xylene.

EXAMPLES 3 TO 6

In each case 1 mole of toluylenediisocyanate with a content of 65% 2,4- and 35% 2,6-isomers is reacted with 1 mole of one of the following monohydroxyl compounds in the manner described in Example 1c.

Example 3a: n-butanol;
Example 4a: isobutanol;
Example 5a: ethyleneglycolmonoethyl ether (Cellosolve);
Example 6a; 2-ethylhexanol-1.

In each case 100 g. of the 50% alkyd resin solution in xylene obtained in accordance with Example 1a were mixed with 10.6 g. of the reaction product obtained according to Examples 3a and 4a, 11.3 g. of the reaction product obtained according to Example 5a and 13.1 g. of the reaction product obtained according to Example 6a, and then heated at 50–60° C. for 5–6 hours without stirring. In this case, the reactions are carried out, on the one hand, in the presence of air and, on the other hand, in the absence of air which is accomplished by completely filling and closing the reaction vessel. In both cases it is possible to obtain light yellow, clear and highly thixotropic alkyd resin solutions.

EXAMPLE 7

(a) 400 g. (1 mole) of a trifunctional polymethylene-polyphenylisocyanate, which is available under the trade name "Papi," are reacted with 152 g. of n-butanol according to Example 1b.

(b) 16.6 g. of the resulting, still warm, intermediate product are added to 100 g. of the 50% alkyd resin solution obtained in accordance with Example 1a and, after thorough mixing, are heated to 60° C. for 5 hours. Upon cooling, there is obtained a clear thixotropic alkyd resin solution having a dark brown color, the latter resulting from the dark color of the starting polyisocyanate.

EXAMPLE 8

(a) Into a 1 liter three-necked flask provided with a stirrer, thermometer and water separator are introduced 350 g. linseed oil, 29 g. linseed fatty acid, 26 g. phthalic acid anhydride, 58.5 g. benzoic acid, 0.02 g. zinc acetate, and 132.5 g. pentaerythrite, and heated within a period of 6 hours to 250° C., while passing carbon dioxide thereover; this temperature is maintained until a sample withdrawn can be diluted to any extent, without turbidity, with ethyl alcohol. After cooling to 190° C., and upon adding 180 g. phthalic acid anhydride and 40 g. xylene the whole is again heated to 230° C. The esterification is now carried out azeotropically until an acid number of <10 is present and the viscosity of a 60% solution in xylene has reached a value of U–V according to Gardner-Holdt; upon initiating the cooling, the xylene is distilled off in a vacuum as the temperature is reduced and the alkyd resin is dissolved to the extent of 50% in mineral spirits. The undissolved resin has a hydroxyl number of 55.

(b) 100 g. of the 50% solution obtained in accordance with Example 8a are mixed with 6.5 g. of the intermediate product obtained according to Example 6a and heated at 60° C. for 6 hours. After cooling, the resulting alkyd resin solution in mineral spirits appeared light yellow, clear and highly thixotropic.

EXAMPLES 9 TO 12

By reacting 100 g. each of the alkyd resin solution in mineral spirits prepared according to Example 8a with the following intermediate products:

Example 9: 5 g. of the intermediate product obtained according to Example 1b;
Example 10: 5.3 g. of the intermediate product obtained according to Example 3a;
Example 11: 5.3 g. of the intermediate product obtained according to Example 4a;
Example 12: 5.6 g. of the intermediate product obtained according to Example 5a;

there are obtained after completing the reaction, which was also carried out at 60° C. for 6 hours, highly thixotropic solutions. However, these solutions are more or less turbid. It is possible to arrive at corresponding clear solutions if, instead of mineral spirits, xylene or toluene are used as solvent.

EXAMPLES 13 TO 17

A dehydrated castor oil-alkyd resin is prepared by dehydration during the alkyd resin production as follows:

Into a 1 liter three-necked flask are introduced, while stirring and passing carbon dioxide thereover, 338 g. castor oil, 98.5 g. trimethylolpropane, and 137 g. phthalic acid anhydride, and heated to 180° C.; this temperature is maintained until a sample withdrawn, upon cooling to room temperature, remains clear. The whole is then heated to 260–265° C. within 4–5 hours and kept at this temperature for 3½ hours. At the end of this period, and after cooling to 160° C., there are added additional 121 g. trimethylolpropane and 175 g. phthalic acid anhydride. At this point, the temperature is again raised to 200–210° C. and maintained until the acid number has fallen below 30 and the viscosity of a 50% solution increases to about 70 seconds (measured in a DIN-cup with a 4 mm. nozzle). Upon cooling, the product is dissolved in xylene to the extent of 50%. The 100% resin has a hydroxyl number of 90.

In each case 100 g. of the 50% alkyd resin solution were mixed with equivalent quantities of the following intermediate products:

Example 13: 5 g. of the intermediate product according to Example 1b;
Example 14: 5.3 g. of the intermediate product according to Example 3a;
Example 15: 5.3 g. of the intermediate product according to Example 4a;
Example 16: 5.6 g. of the intermediate product according to Example 5a;
Example 17: 6.5 g. of the intermediate product according to Example 6a.

After a reaction period of 2 hours at 80° C., there were obtained, upon cooling to room temperature, light brown, clear and highly thixotropic alkyd resin solutions.

EXAMPLES 18 TO 21

(a) 427 g. of a refined tall oil fatty acid having the following characteristics:

Acid number—195.
Iodine number according to Hanus—150–155.
Rosin acid content—max. 2%.
Unsaponifiable—max. 1%.

are slowly heated up to 230–240° C., while stirring, in a three-necked flask of 1 liter capacity together with

| | |
|---|---|
| Linseed oil fatty acid | g-- 22 |
| Pentaerythrite | g-- 144 |
| Phthalic acid anhydride | g-- 171 |
| Xylene | g-- 50 | and are azeotropically esterified at this temperature until the acid number has fallen to a value of <10 and the viscosity of a 50% solution of the reaction product corresponds to E according to Gardner-Holdt. The alkyd resin prepared in this manner is divided into two parts. By the addition of mineral spirits or xylene, there are prepared two 50% solutions. The resin, in undissolved condition, has a hydroxyl number of 60.

EXAMPLE 18b 100 g. of the 50% solution in test benzine according to Examples 18a–22a are mixed at room temperature with 6.5 g. of the intermediate product prepared according to Example 6a and heated for 6 hours at 55° C. in a glass vessel closed with a screw cap and placed in a drying oven. After cooling to room temperature, there is obtained a light-yellow, clear and highly thixotropic alkyd resin solution.

EXAMPLES 19b TO 22b

In each case 100 g. of the 50% alkyd resin solution in xylene prepared according to Example 19a–21a were mixed with the following intermediate products:

Example 19b: 5 g. of the intermediate product according to Example 1b;
Example 20b: 5.3 g. of the intermediate product according to Example 3a;
Example 21b: 5.3 g. of the intermediate product according to Example 4a;
Example 22b: 5.6 g. of the intermediate product according to Example 5a;

and also heated for 6 hours at 55° C. in a glass vessel closed with a screw cap and placed in a drying oven. Also in this case it is possible to obtain, already during cooling to room temperature, highly thixotropic, clear and light-yellow alkyd resin solutions.

I claim:
1. A process for the preparation of thixotropic solutions of oil-modified alkyd resins which comprises (a) preparing a compound (A) by reacting at a temperature ranging from about 50° C. to about 70° C. (1) an alcohol selected from a group consisting of primary and secondary monohydric alcohols and (2) an organic polyisocyanate at an NCO:OH ratio of X:(X−1), wherein X represents the number of NCO groups in said polyisocyanate, said compound (A) bearing one free isocyanate group as a result of step (a), and (b) reacting said compound (A) with (B) an oil-modified alkyd resin bearing free hydroxyl groups, at a temperature ranging from ambient temperature to about 120° C.

2. A process according to claim 1, where step (b) is carried out at a temperature range of from about 50° C. to about 60° C.

3. A process according to claim 1, where step (b) is carried out at a temperature range from about 110° C. to about 120° C.

4. A process according to claim 1, wherein tolylene diisocyanate is used as component (2).

5. A process according to claim 1, wherein the monohydric alcohol used is n-butanol.

6. A process according to claim 1, wherein the monohydric alcohol used is iso-butanol.

7. A process according to claim 1, wherein the monohydric alcohol used is ethylene-glycol monoethylether.

8. A process according to claim 1, wherein the monohydric alcohol used is ethylhexanol.

References Cited
UNITED STATES PATENTS

| | | | |
|---|---|---|---|
| 3,371,056 | 2/1968 | Delius | 260—22 |
| 2,683,728 | 7/1954 | Mastin et al. | 260—77.5 X |

DONALD E. CZAJA, Primary Examiner

C. W. IVY, Assistant Examiner

U.S. Cl. X.R.

260—26, 31.2, 32.8, 33.2, 33.4, 33.6